April 6, 1937.  E. L. NORTON  2,076,248

WAVE FILTER

Filed Aug. 16, 1934  3 Sheets-Sheet 1

INVENTOR
E. L. NORTON
BY
G. H. Stevenson
ATTORNEY

April 6, 1937.  E. L. NORTON  2,076,248
WAVE FILTER
Filed Aug. 16, 1934   3 Sheets-Sheet 2

INVENTOR
E. L. NORTON
BY
ATTORNEY

April 6, 1937.     E. L. NORTON     2,076,248
WAVE FILTER
Filed Aug. 16, 1934     3 Sheets-Sheet 3

INVENTOR
E. L. NORTON
BY G. H. Stevenson
ATTORNEY

Patented Apr. 6, 1937

2,076,248

UNITED STATES PATENT OFFICE 2,076,248

WAVE FILTER

Edward L. Norton, East Orange, N. J., assignor to Bell Telephone Laboratories, Incorporated, New York, N. Y., a corporation of New York Application August 16, 1934, Serial No. 740,033

9 Claims. (Cl. 178—44)

This invention relates to wave filters and more particularly to wave filter systems adapted for the separation of currents in different frequency ranges.

The principal object is the reduction of reflection effects at the junction of a filter system and a line or current source. Another object is to improve the input impedance characteristic of combinations of filters having contiguous transmission ranges.

In accordance with the invention these objects are accomplished by so proportioning the elements of each filter of a connected group with respect to the elements of the other filters that the input impedance of the group as a whole is purely resistive and constant in magnitude at all frequencies. An example of the type of filter combination to which the invention is applicable is given by the directional filters used at repeater points in carrier telephone systems for the separation of the currents in the channels transmitting in one direction from those in the channels transmitted in the opposite direction. These filter combinations comprise a low-pass and a high-pass filter connected together at one end to a telephone line and connected to separate circuits at their other ends. A filter system of this type is shown in United States Patent 1,874,492 issued August 30, 1932 to A. G. Ganz.

The invention will be more fully understood from the following detailed description and from the accompanying drawings of which:

Figure 1:
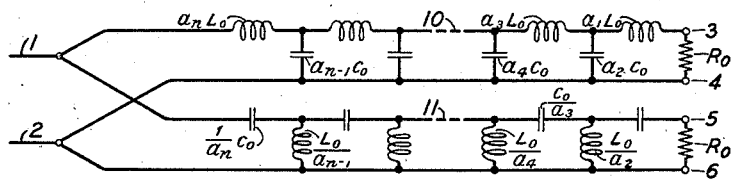
Figs. 1, 2 and 3 represent schematically particular systems in accordance with the invention.

Referring to the drawings, the filter combination in Fig. 1 comprises a low-pass filter 10 and a high-pass filter 11 connected in parallel at their input terminals 1, 2 and having their output terminals 3, 4 and 5, 6, connected to separate load resistances each of value $R_o$. The low-pass filter has series inductances of values $a_1 L_o$, $a_3 L_o$, — $a_n L_o$, and shunt capacities $a_2 C_o$, $a_4 C_o$, — $a_{n-1} C_o$, the total number of elements being $n$, which for the case illustrated is an odd number. The coefficients $a_1$, $a_2$, etc. are simple numerics having values as described later. The inductance $L_o$ and capacity $C_o$ are determined by the cut-off frequency $f_o$ and the resistance $R_o$ by the formulae.

$$L_o = \frac{R_o}{2\pi f_o} \text{ and } C_o = \frac{1}{2\pi f_o R_o} \quad (1)$$

In my earlier Patent 1,788,538, issued January 13, 1931 it is shown that by particular choice of the coefficients $a_1$, $a_2$ etc. a filter of this type may be made to have an overall transmission characteristic such that for a constant voltage, at the terminals 1, 2, the output voltage, at terminals 3, 4, varies with frequency in accordance with the equation $$\frac{|E_2|}{|E_1|} = \frac{1}{\sqrt{1+x^{2n}}} \quad (1a)$$

where $|E_1|$ and $|E_2|$ are the magnitudes of the input and output voltages, respectively, and $x$ denotes the frequency ratio $$\frac{f}{f_o}$$

Since the energy dissipation within the filter is negligibly small or zero it may be assumed that the total input energy is dissipated in the terminal resistance $R_o$, in consequence of which it follows that the input conductance of the filter, denoted by $G_1$, is given by $$G_1 = \frac{G_o}{1+x^{2n}} \quad (2)$$

where $G_o$ is equal to $$\frac{1}{R_o}$$

If now another filter can be found having an input conductance $G_2$ in accordance with the expression $$G_2 = \frac{G_o}{1+\frac{1}{x^{2n}}} \quad (3)$$

the two filters when connected in parallel have a joint conductance of the constant value $G_o$.

The conductance characteristic expressed by Equation 3 corresponds to that of a high-pass filter of the type disclosed in my above mentioned Patent 1,788,538. Filter 11 of Fig. 1 is of this type, the series impedances comprising capacities $$\frac{C_o}{a_1}, \frac{C_o}{a_2}, \text{---} \frac{C_o}{a_2}$$

and the shunt impedances comprising inductances $$\frac{L_o}{a_2}, \ ---\ \frac{L_o}{a_{n-1}}$$

The elements are the same in number as in filter 10, the corresponding elements in the two filters being inversely related to each other so that the product of their impedances is equal to $R_c^2$.

The coefficients $a_1$, $a_2$, etc. have the value given in my aforementioned patent, namely, $$a_1 = \sin\frac{\pi}{2n}$$

$$a_2 = \frac{\sin\frac{3\pi}{2n}\sin\frac{\pi}{2n}}{a_1 \cos^2\frac{\pi}{2n}} \qquad (4)$$

$$a_r = \frac{\sin\frac{2r-1}{2n}\pi \sin\frac{2r-3}{2n}\pi}{a_{r-1}\cos^2\frac{r-1}{2n}\pi}$$

$$a_n = n \sin\frac{\pi}{2n}$$

The two filters are terminated by series branches at their input ends. With this type of termination not only is the joint conductance constant, but, in addition, the susceptance is zero. The impedance of the combination is therefore a pure constant resistance. Obviously, the input conductance of the combination would not be affected by the addition of reactance elements in shunt at the input terminals of the filters. The presence of the additional susceptances would, however, modify the input impedance of the combination so that it would no longer be a constant resistance. It follows, therefore, that for the parallel combination of the filters their input ends must terminate in series branches in order that the requirement of constant input resistance may be met.

Figure 2:
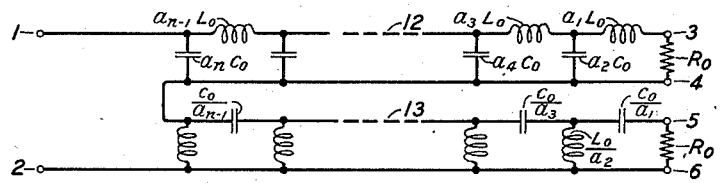

An alternative arrangement of the combination in which the two filters are connected in series at their input ends is shown in Fig. 2. The filters 12 and 13 correspond, in general form, to filters 11 and 12 of Fig. 1, but are terminated in shunt branches at their input ends. The low-pass filter is designed in accordance with my earlier Patent 1,788,538 to provide a transmission characteristic such that the ratio of the output current to the input current varies in accordance with the expression on the right-hand side of Equation 1a, thus giving an input resistance characteristic similar to the conductance characteristic of Equation 2. The coefficients $a_1$, $a_2$, etc. have the same values as given by Equation 4.

Figure 3:
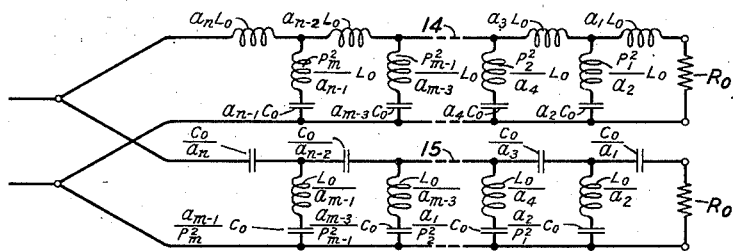

The filters of Figs. 1 and 2 have the disadvantage that their attenuation characteristics do not exhibit peaks of infinite attenuation, in consequence of which a relatively large number of sections is required to provide sharp cut-off at the band limits. An alternative form of filter in accordance with the invention in which this limitation is removed is shown in Fig. 3. In this figure the low-pass filter 14 comprises series inductances $a_1 L_o$, $a_3 L_o$,—$a_n L_o$ and resonant shunt branches comprising condensers $a_2 C_o$, $a_4 C_o$,—$a_{n-1} C_o$ with which are associated, respectively, inductances $$\frac{P_1^2 L_o}{a_2}, \frac{P_2^2 L_o}{a_4}, \ ---\ \frac{P_m^2 L_o}{a_{n-1}}$$

The values of $L_o$ and $C_o$ are the same as given by Equation 1, but the coefficients $a_1$—$a_n$ do not have the values given by Equation 4. The values of these coefficients, the determination of which will be described later, depends not only upon the number of branches in the network, but also on the resonance frequencies of the shunt branches. The coefficients, $P_1$—$P_m$, are simple numerical coefficients of value less than unity which relate the shunt branch resonances to the cut-off frequency $f_o$. These coefficients may be assigned arbitrarily.

The high-pass filter 15 has the same number of branches as 14 and the elements have impedances which are reciprocally related to the impedances of the corresponding elements of the low-pass filter. Thus, the series branches consist of capacities $$\frac{C_o}{a_1}, \frac{C_o}{a_3}, \ ---\ \frac{C_o}{a_n}$$

and the shunt branches comprise inductances $$\frac{L_o}{a_2}, \frac{L_o}{a_4}, \ ---\ \frac{L_o}{a_{n-1}}$$

associated, respectively, with capacities $$\frac{a_2 C_o}{P_1^2}, \ ---\ \frac{a_{n-1} C_o}{P_m^2}$$

The relationship between the two filters may be explained as follows:

I have found that by a suitable choice of the coefficients $a_1$—$a_n$ the input conductance of the low-pass filter 14 can be made to vary in accordance with the Equation $$G_1 = \frac{G_o}{1 - z^2\frac{(P_1^2+z^2)^2---(P_m^2+z^2)^2}{(1+P_1^2 z^2)^2---(1+P_m^2 z^2)^2}} \qquad (5)$$

in which $G_1$ denotes the input conductance, $G_o$ is the conductance of the resistance $R_o$, and $z$ is the frequency function $$\frac{jf}{f_o}$$

$f_o$ being the cut-off frequency. If the low-pass filter be made to have this input conductance the required input conductance of the complementary high-pass filter which will make the sum of the two constant and equal to $G_o$ is readily found to be $$G_2 = \frac{G_o}{1 - y^2\frac{(P_1^2+y^2)^2---(P_m^2+y^2)^2}{(1+P_1^2 y^2)---(1+P_m^2 y^2)}} \qquad (6)$$

in which $G_2$ is the input conductance and $$y = \frac{1}{z}$$

The fact that the two expressions for the conductances have the same form, but involve the inversely related frequency functions $y$ and $z$, leads to a simple structural relationship between the two filter networks. It will be noted that each inductance element of filter 14 has an impedance which may be written in the form $zkR_o$, $k$ being a numerical constant which differs from element to element, and each capacity has an impedance $$\frac{R_o}{zk}$$

If, now, each inductance is replaced by capacity of impedance $ykR_o$ and each capacity by an inductance having an impedance $$\frac{R_o}{yk}$$

the impedance characteristics of the new network can obviously be obtained from those of the original network simply by the substitution of $y$ for $z$ in the appropriate mathematical expressions.

By making the substitutions indicated above in filter 14, the high-pass filter 15 is arrived at, the input conductance of which will be in accordance with Equation 6.

The relationships expressed above and those involved in the filters of Figs. 1 and 2 may be summarized as follows:

One filter of a complementary pair is designed to have an input conductance, when terminated at the output end by a resistance $R_o$, in accordance with the expression $$G_1 = \frac{G_o}{1-[F(z)]^2} \quad (7)$$

$F(z)$ being a function of the quantity $$j\frac{f}{f_o}$$

and the other filter is designed in accordance with the complementary conductance value $$G_2 = \frac{G_o}{1-\left[\dfrac{1}{F(z)}\right]^2} \quad (8)$$

These conditions provide that the joint input conductance of the two filters when connected in parallel will have the constant value $G_o$. If, now, the form of the function $F(z)$ is so chosen that $$F\left(\frac{1}{z}\right) = \frac{1}{F(z)} \quad (9)$$

then the structure of the second network may be derived from the first network by replacing each element thereof by an element having an inverse impedance characteristic as described.

The steps involved in the determination of the coefficients $a_1$ to $a_2$ from the assigned conductance characteristic will now be described.

The starting point in the design of the low-pass filter, for example, is the expression for its input conductance, which includes the specification of the terminal resistance $R_o$ and the resonance frequencies which determine the values of the $P$'s. From this expression an equation is derived which enables the phase angle between the input and the output voltage to be computed at all frequencies. Having determined the phase characteristic in this way, the impedance of the filter as measured at the load terminals with the input terminals short-circuited can be found and then, by a step-by-step process, the impedances of the successive branches starting from the output end may be computed. The computation is simplified by the fact that the various quantities involved need be calculated only for the critical frequencies determined by the $P$'s and for zero and infinite frequency.

If $E_o$ is the voltage across the two filters in parallel, $E_1$ the voltage across the load of the low-pass filter, and $E_2$ the voltage across the load of the high-pass filter, the insertion factors of the two networks may be defined by:

$$\left. \begin{array}{c} e^{\alpha+i\beta} = \dfrac{E_o}{E_1} \\[2mm] \text{and} \\[2mm] e^{\alpha'+i\beta'} = \dfrac{E_o}{E_2} \end{array} \right\} \quad (10)$$

where $\alpha$ and $\beta$ are the attenuation and phase shift, respectively, in the low-pass filter and $\alpha'$ and $\beta'$ are the corresponding quantities for the high-pass filter.

Now since the power into the low-pass filter is $E_o^2 G_1$ and, since this is all absorbed in the load, the network being purely reactive, the relation $E_o^2 G_1 = E_1^2 G_o$ must hold, provided that only the magnitudes of $E_o$ and $E_1$ are taken. From this relation, $$e^{2\alpha} = \frac{G_o}{G_1} = \frac{(1+P_1^2 z^2)^2 \ldots (1+P_m^2 z^2)^2 - z^2(P_1^2+z^2)^2 \ldots (P_m^2+z^2)^2}{(1+P_1^2 z^2)^2 \ldots (1+P_m^2 z^2)^2} \quad (11)$$

with a similar expression for $e^{2\alpha'}$.

Since the right-hand side of Equation 11 is the difference of two squares it may be factored and the equation may be written as $$e^{2\alpha} = \left[\frac{(1+P_1^2 z^2) \ldots (1+P_m^2 z^2) + z(P_1^2+z^2) \ldots (P_m^2+z^2)}{(1+P_1^2 z^2) \ldots (1+P_m^2 z^2)}\right] \times$$

$$\left[\frac{(1+P_1^2 z^2) \ldots (1+P_m^2 z^2) - z(P_1^2+z^2) \ldots (P_m^2+z^2)}{(1+P_1^2 z^2) \ldots (1+P_m^2 z^2)}\right] \quad (12)$$

The numerator of each of the factors on the right of Equation 12 has $2m+1=n$ zeros. Moreover, the form of the equation is such that the zeros of the second factor must be the negatives of the zeros of the first factor, consequently then, if the zeros are $z_1, z_2 - z_n$, Equation 12 may be written $$e^{\alpha+i\beta} e^{\alpha-i\beta} = -\frac{(z-z_1)(z-z_2)\ldots(z-z_n)(z+z_1)\ldots(z+z_n)}{(1+P_1^2 z^2)^2 \ldots (1+P_m^2 z^2)^2}, \quad (13)$$

the left-hand side being obviously equal to $e^{\alpha 2}$. Now since $n=2m+1$ is an odd number, one of the zeros will be real and the other $2m$ will occur in conjugate complex pairs. Let the magnitude of the real zero be $c_0$, the sign being disregarded, and let the real parts of the complex zeros have magnitudes $c_1, c_2 - c_m$, and the imaginary parts $d_1, d_2, - d_m$, then Equation 13 may be written as $$e^{\alpha+i\beta} e^{\alpha-i\beta} = -\frac{\left[\begin{array}{c}(z-c_o)(z+c_o)(z-c_1-jd_1)(z-c_1+jd_1)(z+c_1-jd_1)(z+c_1+jd_1) \\ \ldots (z-c_m-jd_m)(z-c_m+jd_m)(z+c_m-jd_m)(z+c_m+jd_m)\end{array}\right]}{(1+P_1^2 z^2)^2 \ldots (1+P_m^2 z^2)^2} \quad (14)$$

Half of the factors on the right must belong with $e^{\alpha+i\beta}$ and the other half with $e^{\alpha+i\beta}$. From physical considerations, it is well known that $e^{\alpha+j\beta}$ must have zeros in $z$ which have negative real parts. We have then, by selecting the appropriate factors $$e^{\alpha+j\beta}=\frac{(z+c_o)(z+c_1+jd_1)(z+c_1-jd_1)\ldots(z+c_m+jd_m)(z+c_m-jd_m)}{(1+P_1^2z^2)\ldots(1+P_m^2z^2)} \quad (15)$$

It follows directly from this that the phase $\beta$ is given by:

$$\beta=\tan^{-1}\frac{1}{c_o}x+\tan^{-1}\frac{2c_1x}{c_1^2+d_1^2-x^2}+\ldots+\tan^{-1}\frac{2c_mx}{c_m^2+d_m^2-x^2} \quad (16)$$

where $$x=\frac{f}{f_o}$$

and the $c$'s and $d$'s are obtained from the roots of $$[(1+P_1^2z^2)\ldots(1+P_m^2z^2)]+z[(P_1^2+z^2)\ldots(P_m^2+z^2)]=0 \quad (17)$$

Now it may readily be shown that the phase difference between the voltage across the input to a reactive network, and the voltage across the resistive load is given by $$\tan\beta=G_oX$$

where $G_o$ is the load conductance and $X$ is the short-circuit reactance of the network measured from the terminals connected to $G_o$.

If Equation 17 can be solved, the phase shift is obtained from Equation 16 and the reactance of the network from the relation $G_oX=\tan\beta$.

Putting Equation 17 into the form $$1+z\frac{(P_1^2+z^2)\ldots(P_m^2+z^2)}{(1+P_1^2z^2)\ldots(1+P_m^2z^2)}=0 \quad (18)$$

it is clear that the product term must have a magnitude of unity and a vector angle of 180 degrees. It may be shown that the typical term $$\frac{(P^2+z^2)}{(1+P^2z^2)}$$

of the product has a magnitude which is less, equal to, or greater than unity according as the magnitude of $z$ is less, equal to, or greater than unity, $P$ being a numeric less than unity. For Equation 13 to hold, then, the magnitude of each root must be unity. One root is, obviously, $z=-1$, the others are of the form $$z=-(\cos\theta_i+j\sin\theta_i)$$

the angles $\theta_i$ being as yet undetermined.

The determination of the angles is difficult in the general case but particular solutions for filters having up to three of the $P$ coefficients have been worked out and are given below. More complex cases can be solved in the same way but these are not necessary for practical purposes.

After factoring by $(z+1)$ Equation 17 is a reciprocal equation of order $2m$ in $z$ and may therefore be transformed to $$(1+z)F_m(p)=0 \quad (19)$$

in which $F_m(p)$ is a function of order $m$ of the quantity $$p=z+\frac{1}{z}=2\cos\theta$$

This transformation makes it necessary to solve only the lower order equation $$F_m(p)=0 \quad (20)$$

to obtain the angles $\theta_i$ corresponding to the roots of Equation 17.

For the particular cases mentioned above the equations to be solved are as follows:

a. $P_1$ finite,
$$p-(1-S_1)=0$$

b. $P_1$ and $P_2$ finite,
$$p^2-(1-S_2)p-(1-S_1+S_2)=0$$

c. $P_1$, $P_2$, and $P_3$ finite,
$$p^3-(1-S_3)p^2-(2-S_1+S_3)p+(1-S_1+S_2-S_3)=0 \quad (21)$$

d. $P_1$, $P_2$, $P_3$ and $P_4$ finite,
$$p^4-(1-S_4)p^3-(3-S_1+S_4)p^2+(2-S_1+S_3-2S_4)p+(1-S_1+S_2-S_3+S_4)=0$$

e. $P_1$ to $P_5$ finite,
$$p^5-(1-S_5)p^4-(4-S_1+S_5)p^3+(3-S_1+S_4-3S_5)p^2+(3-2S_1+S_2-S_4+2S_5)p-(1-S_1+S_2-S_3+S_4-S_5)=0$$

where the $S$'s are the symmetric functions of the $P^2$'s, namely, $$S_1=P_1^2+P_2^2+\ldots+P_m^2$$
$$S_2=P_1^2P_2^2+\ldots+P_{m-1}^2P_m^2 \quad (22)$$
$$S_3=P_1^2P_2^2P_3^2+\ldots+P_{m-2}^2P_{m-1}^2P_m^2$$

$$S_m=P_1^2P_2^2\ldots P_{m-1}^2P_m^2$$

The foregoing equations have real roots only, lying between $-2$ and $+2$. If $m$ is even there is an equal number of positive and negative roots, if $m$ is odd there is one more positive than negative root. After determining the roots the values of the angle $\theta_i$ are given by $2\cos\theta_i=|p_i|$ where $|p_i|$ is the magnitude of a root obtained numerically from Equation 21.

In the development of methods of finding the elements of the filter, it will be necessary to obtain the value of $$\frac{d\beta}{dx}$$

This is readily found by putting Equation 16 into the form $$\beta=\tan^{-1}x+\sum_1^m\tan^{-1}\frac{2x\cos\theta_i}{1-x^2} \quad (23)$$

which, when differentiated gives $$\frac{d\beta}{dx}=\frac{1}{1+x^2}+\sum_1^m\frac{2(1+x^2)\cos\theta_i}{1+2x^2\cos\theta_i+x^4} \quad (24)$$

For a physically realizable structure, it is necessary to arrange the filters of Fig. 3 so that the shunt branches nearest the load impedances resonate at the frequencies farthest from the cut-off and that the other shunt branches taken in their order from the load impedance have resonances successively closer to the cut-off. The factors $P_1$, $P_2$, etc. should be chosen so that $$P_1<P_2<P_3\ldots<P_m$$

or, in other words, so that $P_1$ refers to the shunt branch nearest the load, $P_2$ to the second branch from the load, $P_3$ to the third, and so on.

To find the elements of the filter we know the short-circuit reactance from the load end to be $X=R_o\tan\beta$. Now at the frequency $$\frac{f_o}{P_1}$$

the first shunt arm is a short circuit so that the reactance is simply the reactance of the first series coil, or $$2\pi f a_1 L_o = R_o \tan \beta_1$$

where $$\beta_1 = \beta \text{ with } x = \frac{1}{P_1}$$

Since, by definition $$L_o = \frac{R_o}{2\pi f_o}$$

then $$a_1 = P_1 \tan \beta_1 \quad (25)$$

The reactance of the first series coil is $a_1 R_o x$. If this is subtracted from the total reactance we obtain $R_o(\tan \beta - a_1 x)$ as the reactance of the remainder of the circuit, starting with the first resonant shunt. At frequencies very close to the resonant point the reactance is determined solely by the reactance of the shunt and the differential of the shunt reactance is the differential of the total reactance at the resonant frequency. The reactance of the first shunt is equal to $$\frac{R_o}{a_2} \frac{P_1^2 x^2 - 1}{x}$$

so that $$\frac{d}{dx} \frac{R_o}{a_2} \frac{P_1^2 x^2 - 1}{x_2} = \frac{d}{dx} R_o (\tan \beta - a_1 x)$$

from which $$\frac{1}{a_2} = \frac{1}{2P_1^2}\left[(1+\tan^2 \beta_1)\left(\frac{d\beta}{dx}\right)_1 - a_1\right] \quad (26)$$

where $$\left(\frac{d\beta}{dx}\right)_1 = \frac{d\beta}{dx} \text{ with } x = \frac{1}{P_1}$$

Carrying out the next step, the reactance of the network after removing the first shunt is:

$$\frac{R_0}{\dfrac{1}{\tan \beta - a_1 x} - \dfrac{a_2 x}{P_1^2 x^2 - 1}}$$

As in the first step, this is equal to the reactance of the second series coil $a_3 L_o$ at $$x = \frac{1}{P_2}$$

so that $$\frac{1}{a_3} = \frac{a_2}{P_2^2 - P_1^2} - \frac{1}{a_1 - P_2 \tan \beta_2} \quad (27)$$

These operations may be carried on to secure all of the elements of the filter up to the last series coil. To determine this note that as the value of $x$ approaches zero the short-circuit reactance approaches $(a_1 + a_3 + a_5 \cdots + a_n)x$. From (6b) the value of $\tan \beta$ as $x$ approaches zero is $$(1 + \Sigma_1^m 2 \cos \theta_i)x$$

That is:

$$a_n = 1 + \Sigma_1^m 2 \cos \theta_i - (a_1 + a_3 + \ldots + a_{n-2}) \quad (28)$$

The coefficients $a_4$, $a_5$ and $a_6$ determined in the foregoing manner are found to be as follows:

$$\frac{1}{a_4} = a_3^2$$

$$\left[\frac{(1+\tan^2 \beta_2)\left(\dfrac{d\beta}{dx}\right)_2 - P_2 \tan \beta_2}{2P_2^2(a_1 - P_2 \tan \beta_2)^2} - \frac{a_2}{(P_2^2 - P_1^2)^2}\right] \quad (29)$$

$$\frac{1}{a_5} = \frac{a_4}{P_3^2 - P_2^2} - \frac{1}{a_3 - \dfrac{1}{\dfrac{a_2}{P_3^2 - P_1^2} - \dfrac{1}{a_1 - P_3 \tan \beta_3}}} \quad (30)$$

and $$\frac{1}{a_6} = a_5^2 \left[\frac{(1+\tan^2 \beta_3)\left(\dfrac{d\beta}{dx}\right)_3 - P_3 \tan \beta_3}{2P_3^2(a_1 - P_3 \tan \beta_3)^2 \left[a_3\left(\dfrac{a_2}{P_2^2-P_1^2} - \dfrac{1}{a_1 - P_3 \tan \beta_3}\right) - 1\right]} - \frac{a_2}{(P_3^2 - P_1^2)^2} - \frac{a_4}{(P_3^2 - P_2^2)^2}\right] \quad (31)$$

As an illustration, consider a three-section filter with $P_1^2 = .23$, $P_2^2 = .60$, $P_3^2 = .80$. These correspond to ratios of frequencies of infinite loss to $f_o$ of 2.08, 1.29 and 1.12, respectively. The insertion loss A is given in decibels by $$A = 10 \log_{10}\left[1 + x^2 \frac{(.23 - x^2)^2(.60 - x^2)^2(.80 - x^2)^2}{(1-.23x^2)^2(1-.60x^2)^2(1-.80x^2)^2}\right] \quad (32)$$

The equation yielding the required roots is:

$$p^3 - .8896\, p^2 - .4804\, p + .0616 = 0$$

from which 2 cos $\theta_1 = .10894$,
2 cos $\theta_2 = .45690$,
2 cos $\theta_3 = 1.23756$.

The coefficients $a_1$ to $a_7$, computed in accordance with the formulae given above are found in this case to be $a_1 = .0588$,
$a_2 = .602$,
$a_3 = .883$,
$a_4 = .845$,
$a_5 = .926$,
$a_6 = .674$,
$a_7 = .935$.

Figure 4:
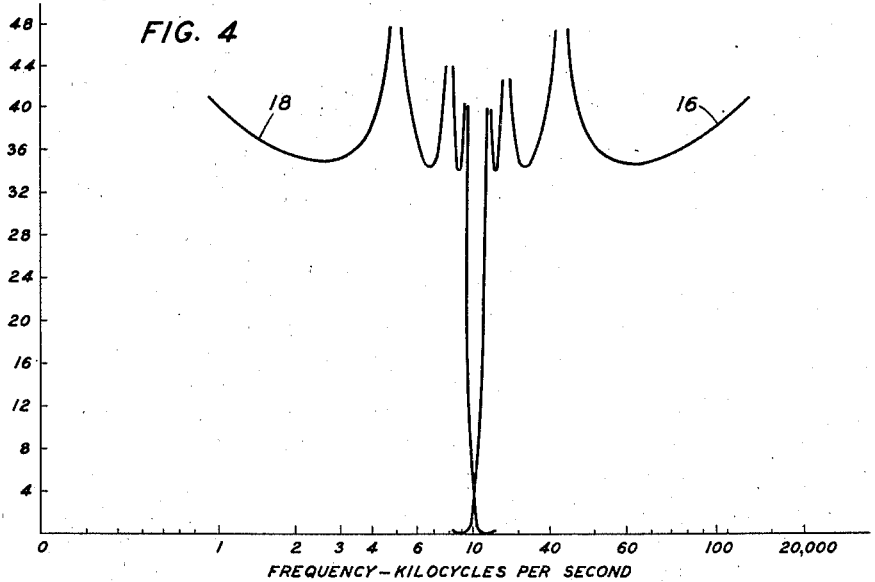
Fig. 4 is a typical transmission characteristic of the system of Fig. 3.

The values of these coefficients having been determined the actual element values follow readily from the formulae expressing them in terms of $L_o$ and $C_o$, the values of which, in turn, are given in terms of $R_o$ and the cut-off frequency by Equation 1. The insertion loss characteristics of the two filters of a complementary pair having the constants given above and designed for a cut-off frequency of 10,000 cycles per second are shown in Fig. 4, curve 16 representing the low-pass filter and curve 17 the high-pass filter. The ordinates of these curves are decibels loss and the abscissæ are frequencies plotted on a logarithmic scale which brings out an image relationship between the two curves, the figure being symmetrical about the cut-off frequency.

The two-filter structure considered in the foregoing is subject to the practical objection that the loss at the cross-over frequency is limited to 3 decibels for each filter. This is unavoidable with two non-dissipative filters since at some frequency each of the filters must absorb half of the power. The restriction may be avoided by adding a third filter of the band-pass type to absorb the power at the cross-over point. Since the band-pass filter will absorb all of the power at the frequency $f_o$, corresponding to $x^2 = -1$, both the low and the high-pass filter musthave a section added to them having an infinite loss at that point.

Consider the expression for the conductance of a low-pass filter of $m$-1 sections. This is:

$$G_1' = \frac{G_o}{1-z^2\frac{(P_1^2+z^2)^2\cdots(P_{m-1}^2+z^2)^2}{(1+P_1^2z^2)^2\cdots(1+P_{m-1}^2z^2)^2}} = \frac{G_o(1+P_1^2z^2)^2\cdots(1+P_{m-1}^2z^2)^2}{(1-z^2)F_{m-1}(p)F_{m-1}(-p)} \quad (34)$$

where $$p = z + \frac{1}{z} \text{ and } F_{m-1}(p)$$

is an expression of the type obtained when Equation 17 is divided through by $1+z$, its form for particular cases being given by Equation 21. The conductance of a corresponding high-pass filter would be:

$$G_2' = \frac{G_o z^2(P_1^2+z^2)^2\cdots(P_{m-1}^2+z^2)^2}{(z^2-1)F_{m-1}(p)F_{m-1}(-p)} \quad (35)$$

Now let each of these expressions be multiplied by the factor $$\frac{1}{1-\dfrac{M^2}{p^2 F_{m-1}(p)F_{m-1}(-p)}}$$

where M is a constant. The conductance of the low-pass filter will then be:

$$G_1 = \frac{G_o p^2(1+P_1^2z^2)^2\cdots(1+P_{m-1}^2z^2)^2}{(z^2-1)[M^2 - p^2 F_{m-1}(p)F_{m-1}(-p)]} \quad (36)$$

This conductance is zero when $p$ is zero, that is, at the frequency $f_0$, and also at the frequencies $$\frac{f_o}{P_1} \cdots \frac{f_o}{P_{m-1}}$$

and is nearly equal to $G_0$ at lower frequencies. It corresponds therefore to the conductance of a low-pass filter having $m$ sections, one for each attenuation peak. The form of the conductance expression is not the same as that given in Equation 5, but it represents a network which can be realized physically. If the conductance of the corresponding high-pass filter be added to this and the sum subtracted from $G_0$ a conductance $G_3$ is found which will be complementary to $G_1$ and $G_2$ together and which has the value $$G_3 = \frac{G_o}{1 - p^2\dfrac{F_{m-1}(p)F_{m-1}(-p)}{M^2}} \quad (37)$$

This may be identified as the conductance of a band-pass filter of the "constant $k$" type having $$\frac{m-1}{2}$$

sections, that is, one in which the product of the impedances of a series branch and a shunt branch is invariable with frequency.

The value of $M^2$ may be fixed by assigning the frequencies at which the insertion loss of the band-pass filter is 3 decibels or at which $$G_3 = \frac{G_o}{2}$$

Since $p$ is equal to $$j\left(\frac{f}{f_o} - \frac{f_o}{f}\right)$$

these frequencies will be symmetrically spaced about $f_0$ and will correspond to the same value of $p^2$ which will be denoted by $p_0^2$. From this condition $$G_3 = \frac{G_o}{1 + \dfrac{p^2}{p_o^2}\dfrac{F_{m-1}(p)F_{m-1}(-p)}{F_{m-1}(p_o)F_{m-1}(-p_o)}} \quad (38)$$

the value of $M^2$ being given by $$M^2 = -p_o^2 F_{m-1}(p_o)F_{m-1}(-p_o) \quad (39)$$

Putting this value of $M^2$ in Equation 36 and remembering that the loss in the filter is given by $$e^{2\alpha} = \frac{G_o}{G_1}$$

the equation for the zeros in $p$ for the low-pass filter is found to be $$P_o^2 F_{m-1}(p_o)F_{m-1}(-p_o) + p^2 F_{m-1}(p)F_{m-1}(-p) = 0 \quad (40)$$

From Equations 35 and 38 for the conductances of the high-pass and band-pass filters it is evident that Equation 40 will give the zeros in $p$ for these filters also.

Equation 40 can be solved numerically in any particular case with any desired degree of accuracy. When the numerical roots have been determined they may be applied in the manner already described to the design of a low-pass filter and a high-pass filter having the same general form as those of Fig. 3. The band-pass filter being of the "constant $k$" type the computation of its constants is more readily accomplished by following the mathematical procedure described in my earlier Patent 1,788,538.

The schematic circuit of a filter group of the type described above is shown in Fig. 5, in which 18 is a low-pass filter, 19 the corresponding high-pass filter and 20 the band-pass filter which compensates the joint conductances of the other two. The low-pass and high-pass filters have each three sections and the band-pass filter one section. The shunt branches of the low-pass and the high-pass filters are resonant circuits and, as in the case of the filters of Fig. 3, the branches nearest the load impedances have resonance frequencies most remote from the cut-off. The shunt branches adjacent the input ends resonate at the frequency $f_0$.

Figure 5:
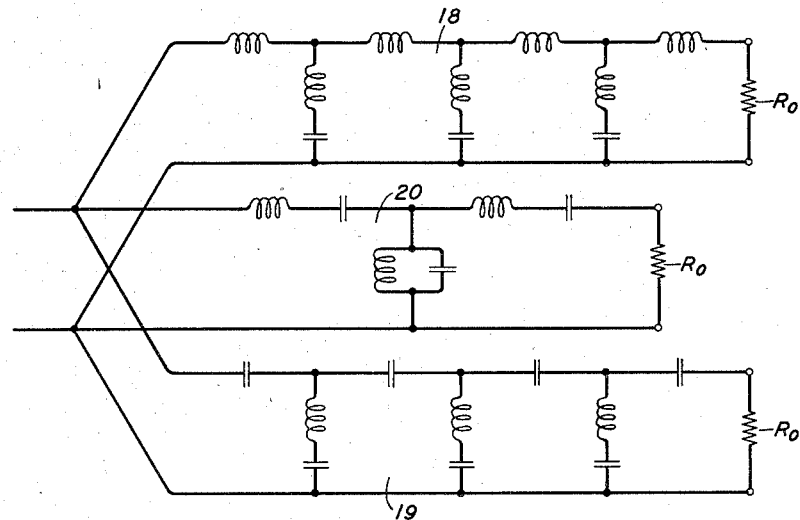
Figs. 5 and 6 are respectively a schematic arrangement and a transmission characteristic of a modified form of the invention.
Figure 6:
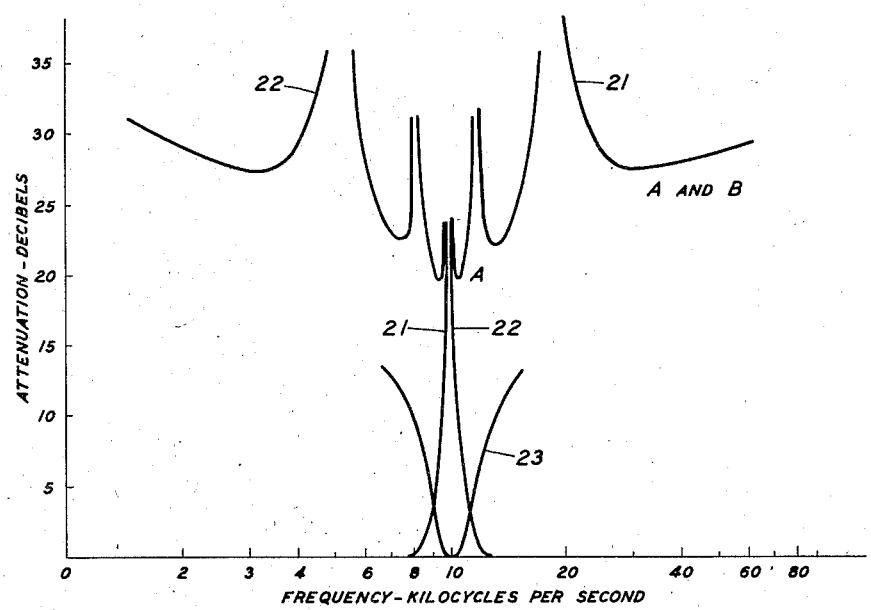

The insertion loss characteristics of the individual filters of a group such as shown in Fig. 5 are shown by the curves of Fig. 6 for the assumed conditions $$P_1^2 = .288, \; P_2^2 = .750, \; P_3^2 = 1 \text{ and } P_o = j.2236,$$

the cross-over frequency of the high- and low-pass filter being 10,000 cycles per second. Curve 21 represents the low-pass filter, curve 22 the high-pass filter and curve 23 the band-pass filter.

Figure 7:
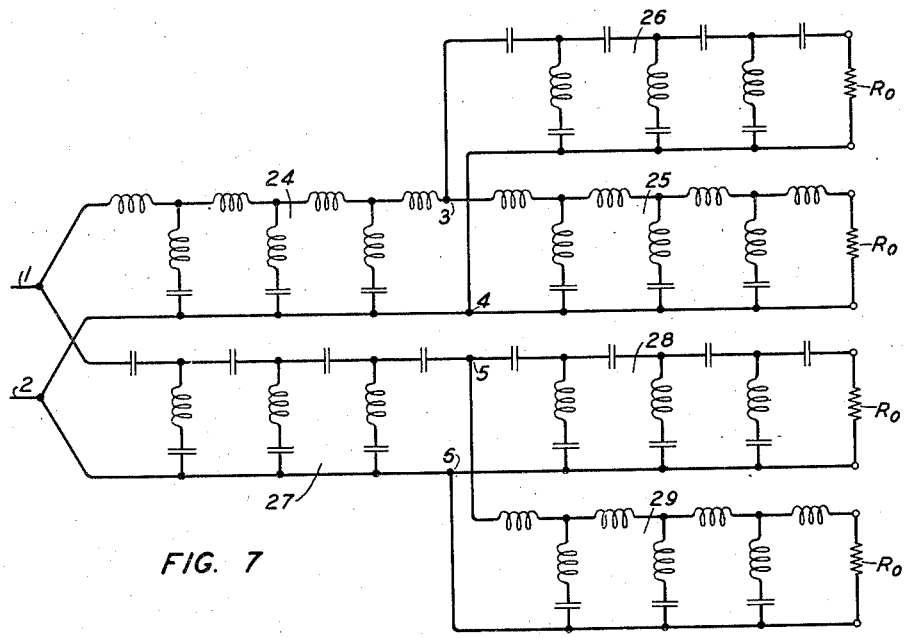
Figs. 7 and 8 represent additional modifications.

Another arrangement in accordance with the invention for increasing the loss at the cross-over point is shown in Fig. 7. This arrangement uses three pairs of complementary filters of the type shown in Fig. 3. The low-pass channel comprises filters 24 and 25 in tandem and the high-pass filter comprises filters 27 and 28. The terminal resistances $R_0$ of these channels may be provided by transmission lines, or amplifiers, or other utilization circuits.

Filters 24 and 27 may be proportioned as already described for a cut-off or cross-over frequency $f_0$. Filter 25 is then proportioned for a cut-off frequency lower than $f_0$, filter 26 being complementary thereto, and filters 28 and 29 are proportioned for a cut-off higher than $f_0$. The input impedance at terminals 3, 4 of the filter pair 25 and 26 is a constant resistance as is also the input impedance at terminals 5 and 6. These impedances therefore provide the proper resistances for the termination of filters 24 and 25. The insertion losses of filters 25 and 28 are thus added to the 3 decibel loss of filters 24 and 27 at this frequency without disturbing the constant resistance character of the system.

It will be obvious that the system of Fig. 7 may also be constructed using filter combinations of the types shown in Fig. 1 and also that any of the complementary pairs may be of this type. Moreover, the series connected combination of Fig. 2 may likewise be substituted for any of the complementary pairs.

Figure 8:
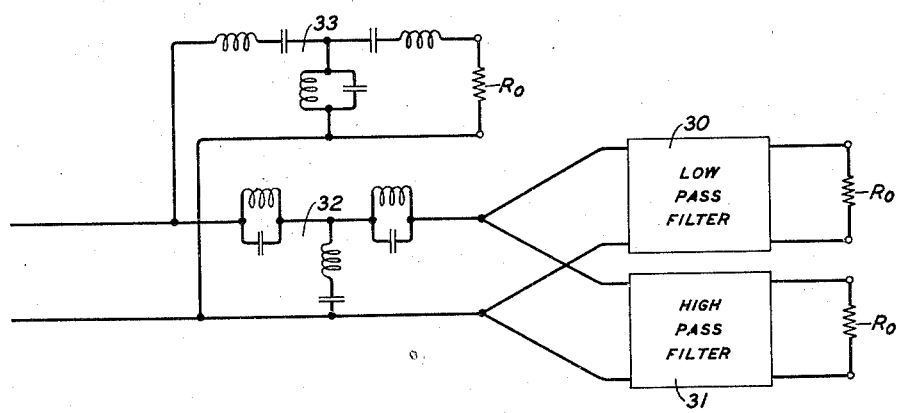

A further arrangement for increasing the loss at the cross-over point which is more economical of impedance elements than the system of Fig. 7, is shown schematically in Fig. 8. In this arrangement a band elimination filter 32 is inserted ahead of the common input to the complementary filters 30 and 31, this filter being designed to provide whatever attenuation is desired at the cross-over frequency $f_0$ and to have low attenuation at frequencies away from this value. A complementary filter 33 is provided in parallel with 32 to compensate the input impedance.

The filter 33 is a band-pass filter of the type described in my earlier Patent 1,788,538, issued January 13, 1931, and filter 33 is the complementary filter thereto obtained in the manner already described by substituting elements of inverse impedances for the elements of filter 32.

In the claims which follow the expression complementary wave filters is used to define filters having contiguous frequency ranges of substantially unattenuated transmission which together cover the whole frequency range from zero to infinity.

What is claimed is:

1. In combination a low-pass wave filter, a load of resistance $R_0$ connected to the output terminals of said filter, a compensating network connected in parallel with the input terminals of said filter, said filter comprising a plurality of reactive impedances connected alternately in series and in shunt and proportioned with respect to the load resistance and the band limiting frequencies to provide an input conductance in accordance with the equation $$G_1 = \frac{G_0}{1-(F(Z))^2}$$

where $G_1$ is the input conductance, $G_0$ is the conductance of the load resistance $R_0$ and $F(Z)$ is a function of the frequency ratio $$jf \div f_0, f_0$$

being the cut-off frequency, of such character that $$F\left(\frac{1}{Z}\right) = 1 \div F(Z)$$

and said compensating network being proportioned to have an input conductance in accordance with the equation $$G_2 = \frac{G_0}{1-\left(\frac{1}{F(Z)}\right)^2}$$

where $G_2$ is the input conductance of the compensating network, whereby the input conductance of the combination is constant at all frequencies.

2. A combination in accordance with claim 1 in which the compensating network comprises a high-pass filter and a band-pass filter connected in parallel at their input ends.

3. A combination in accordance with claim 1 in which the compensating network comprises a high-pass filter.

4. A combination in accordance with claim 1 in which the low-pass filter is a network of the series-shunt type each section of which includes a non-resonant series branch and a resonant shunt branch and the compensating network is a high-pass filter also of the series-shunt type each section thereof including a non-resonant series branch and a resonant shunt branch.

5. A combination in accordance with claim 1 in which the low-pass filter is a network of the series-shunt type comprising a plurality of sections, each section including a resonant shunt branch, the resonance frequencies of said shunt branches differing progressively from section to section, and the compensating network is a series-shunt network comprising a like number of sections, each section including a resonant shunt branch the impedance elements of which are reciprocally related to the impedance elements of the corresponding shunt branch of the low-pass filter.

6. A wave transmission network comprising a pair of complementary broad-band wave filters connected together at their input ends to a common pair of input terminals, one of said filters having a frequency variable current-voltage characteristic at its input terminals represented by the frequency function $$\frac{A_0}{1-[F(z)]^2}$$

wherein $A_0$ is a constant and $F(z)$ is a function of the frequency ratio $jf/f_0$, $f_0$ being a frequency defining the band limits of the filters, and the other of said filters having a corresponding current-voltage characteristic represented by the frequency function $$\frac{A_0}{1-\left[\frac{1}{F(z)}\right]^2}$$

whereby the combination has a constant resistive impedance at the common input terminals.

7. A wave transmission network comprising a pair of complementary broad-band wave filters connected together at their input ends to a common pair of input terminals, one of said filters having a frequency variable current-voltage characteristic at its input terminals represented by the frequency function $$\frac{A_0}{1-[F(z)]^2}$$

wherein $A_0$ is a constant and $F(z)$ is a function of the frequency ratio $jf/f_0$, $f_0$ being a frequency defining the band limits of the filters, and the other of said filters having a corresponding current-voltage characteristic represented by the frequency function $$\frac{A_0}{1-\left[\frac{1}{F(z)}\right]^2}$$

said function $F(z)$ being such that $$F(z) = \frac{1}{F\left(\frac{1}{z}\right)}$$

whereby the combination has a constant resistive impedance at the common input terminals.

8. A wave filter combination in accordance with claim 6 in which the complementary filters are respectively low-pass and high-pass and in which the frequency characteristic F(z) has the value $$[F(z)]^2 = \left(\frac{f}{f_o}\right)^{2n}$$

$n$ being any integer.

9. A wave filter system comprising in combination a first pair of complementary low-pass and high-pass filters connected together at their input ends to a common pair of input terminals, a second pair of complementary low-pass and high-pass filters connected together at their input ends to the output terminals of the low-pass filter of said first pair, a third pair of complementary low-pass and high-pass filters connected together at their input ends to the output terminals of the high-pass filter of said first pair, and resistive load impedances connected respectively to the output terminals of each of the filters of said second and third pairs, said first pair of filters having a common cut-off at a frequency $f_o$, said second pair having a common cut-off at frequency lower than $f_o$ and said third pair having a common cut-off at a frequency higher than $f_o$, each of said filter pairs comprising a constant resistance combination in accordance with claim 6.

EDWARD L. NORTON.